United States Patent [19]
Chwastyk et al.

[11] 3,745,571
[45] July 10, 1973

[54] COHERENT DIGITAL MULTIFUNCTION PROCESSOR

[75] Inventors: Adolph M. Chwastyk; Alan M. Diamant, both of Silver Spring, Md.

[73] Assignee: The United States of America as represented by the Secretary of the Navy, Washington, D.C.

[22] Filed: Feb. 18, 1972

[21] Appl. No.: 227,586

[52] U.S. Cl. ........ 343/7.7, 343/5 DP, 343/17.2 PC, 343/100 CL
[51] Int. Cl. .............................................. G01s 9/42
[58] Field of Search ...................... 343/17.2 PC, 7.7, 343/5 DP, 100 CL

[56] References Cited
UNITED STATES PATENTS

| | | | |
|---|---|---|---|
| 3,176,293 | 3/1965 | Nolen et al. | 343/7.7 X |
| 3,618,095 | 11/1971 | Darlington | 343/17.2 PC |
| 3,706,989 | 12/1972 | Taylor, Jr. | 343/7.7 X |

*Primary Examiner*—Malcolm F. Hubler
*Attorney*—R. S. Sciascia and Joseph A. Cook

[57] ABSTRACT

A coherent digital multifunction processor that is capable of multiple-mode processing and can also perform rapid inter-mode switching. Additionally, while processing data in a given mode, the subject processor is capable of self-synchronization, thereby obviating the requirement for external synchronous devices. The instant processor has a central control which may suitably utilize a general purpose computer in one embodiment. The primary modes of operation of the subject processor are: a pulse doppler acquisition and/or tracking mode, a moving target indicator mode, and an incoherence mode.

12 Claims, 10 Drawing Figures

COHERENT DIGITAL MULTIFUNCTION PROCESSOR

BACKGROUND OF THE INVENTION

An important result of the years of experience with radar is the realization that no one combination of transmission pattern and echo processing scheme is best for the wide variety of commercial and government radar applications. This is true even for a particular radar having a narrowly prescribed mission. The conflicting demands of search and track operations, the vagaries of weather, chaff and other clutter, the different types of electronic interference, and the many forms of the targets of interest all frustrate the search for the "best" radar system even for a specific application.

This situation suggests the need for "adaptive" radars, single systems with multiple modes and parameters to deal effectively with the changing tasks and environment. In the past, such systems were not feasible because of the instabilities, timing restrictions, poor reliability, and high costs characteristic of analog hardware. As a result, separate radars each with very little flexibility were built to perform the search, acquisition, and tracking functions. Today, however, the high speed, reliability, and low cost of digital microelectronic components make it practical to build digital radar synchronizers and processors that do not suffer the restrictions of their analog counterparts. Data can be integrated or stored for unlimited times without loss. Transmission patterns and receiver delays can be changed without switching components. Size and weight are reduced. Ultimate control can be performed by a digital general purpose computer thereby enhancing the natural flexiblity of the digitized radar.

Thus, from the above the need for digital multipurpose radar is made clear. The need to study the clutter characteristics that must determine its modes and how it is to be programmed for adaptive detection, acquisition, and tracking is also made obvious. To supply these needs the present invention, a coherent digital multifunction processor, hereinafter referred to as CODIMUP, is provided. Codimup is a digital synchronizer-processor (hereafter referred to simply as "processor") that can be incorporated into many radar defense, traffic control, or meteorological systems. It is designed specifically to demonstrate the digital implementation of a processor having several modes and parameter options to investigate land and weather clutter properties; to provide rapid comparisons of the effectiveness of the waveforms in rejecting the many varieties of clutter; and to determine the criteria for mode selection and threshold setting, based on target and clutter characteristics, in an adaptive system.

SUMMARY OF THE INVENTION

Codimup has two fundamental processing modes: Moving Target Indication (MTI) and Pulse Doppler (PD). MTI and PD systems combine the advantage of simple pulse and continuous wave radars by providing both range and velocity discrimination. A PD or MTI transmission is a set of pulses that are samples of a stable, noise free sine wave; thus the pulses are coherently related. The time of reception of each echo from a target is proportional to range, and the doppler frequency shift on the sine wave samples is proportional to radial velocity. For example, a frequency analysis of the echoes from a volume cell can reveal an aircraft in land clutter, even though the aircraft contributes only a small percentage of the total return power.

In the MTI mode, a single notch filter rejects echoes within a band of clutter frequencies, while passing all those at targer frequencies. The filtering is accomplished by a process of cancelling successive echo pulses against each other. Phase corrections can be applied to the pulse to center the filter at frequencies other than zero. The uncancelled "residue" signals are from targets moving at velocities outside the MTI notch.

In the PD mode, a set of filters distributes the echo energy into velocity storage elements or "bins", thus performing a spectrum analysis on the contents of each volume cell. Each filter is formed by applying appropriate phase corrections or "rotations" to the set of received pulse and then integrating the rotated pulses coherently. The process is equivalent to finding the complex discrete Fourier Transform of the echo pulses.

While PD and MTI modes both use doppler techniques to help discriminate between reflectors, the methods of processing in the two modes are distinct, causing differences in filter characteristics that influence performance in clutter. A major difference is that the MTI mode cancels and thus rejects signals within the band of clutter frequencies, while the PD mode merely segregates that band of frequencies into one or more filter bins. The effect is that the MTI mode loses a target whose doppler is within the band of clutter frequencies, while the PD mode retains the target and clutter power in some number of filter bins which may be thresholded to detect the target. The MTI mode has the advantage of being faster in processing the returns from a given volume and requires fewer pulses, making it the logical mode to choose for search operations in moderate clutter.

The instant invention is designed to be versatile, provide alternate modes for changing tasks and environmental conditions. It makes possible quantitative comparisons of the performance of different waveforms or processing techniques in the same target environment. Entirely digital, the subject processor interfaces naturally with a digital computer which ultimately can be programmed to do adaptive mode switching based on target-clutter characteristics.

It is an object of this invention to provide a processor that is capable of multiple-mode and intermode processing.

It is another object of this invention to provide a digital processor that can operate in a coherent fashion.

It is another object of this invention to provide multifunction digital processor that is capable of operating in both pulse doppler acquisition and tracking modes.

It is another object of this invention to provide a coherent digital processor that is capable of self-synchronization.

It is another object of this invention to provide a coherent digital multifunction processor that is capable of operating in a moving target indicator mode.

These and other objects of the present invention will become better understood when considered with the detailed description and also with the accompanying drawings.

DETAILED DESCRIPTION OF THE INVENTION

Figure 1:
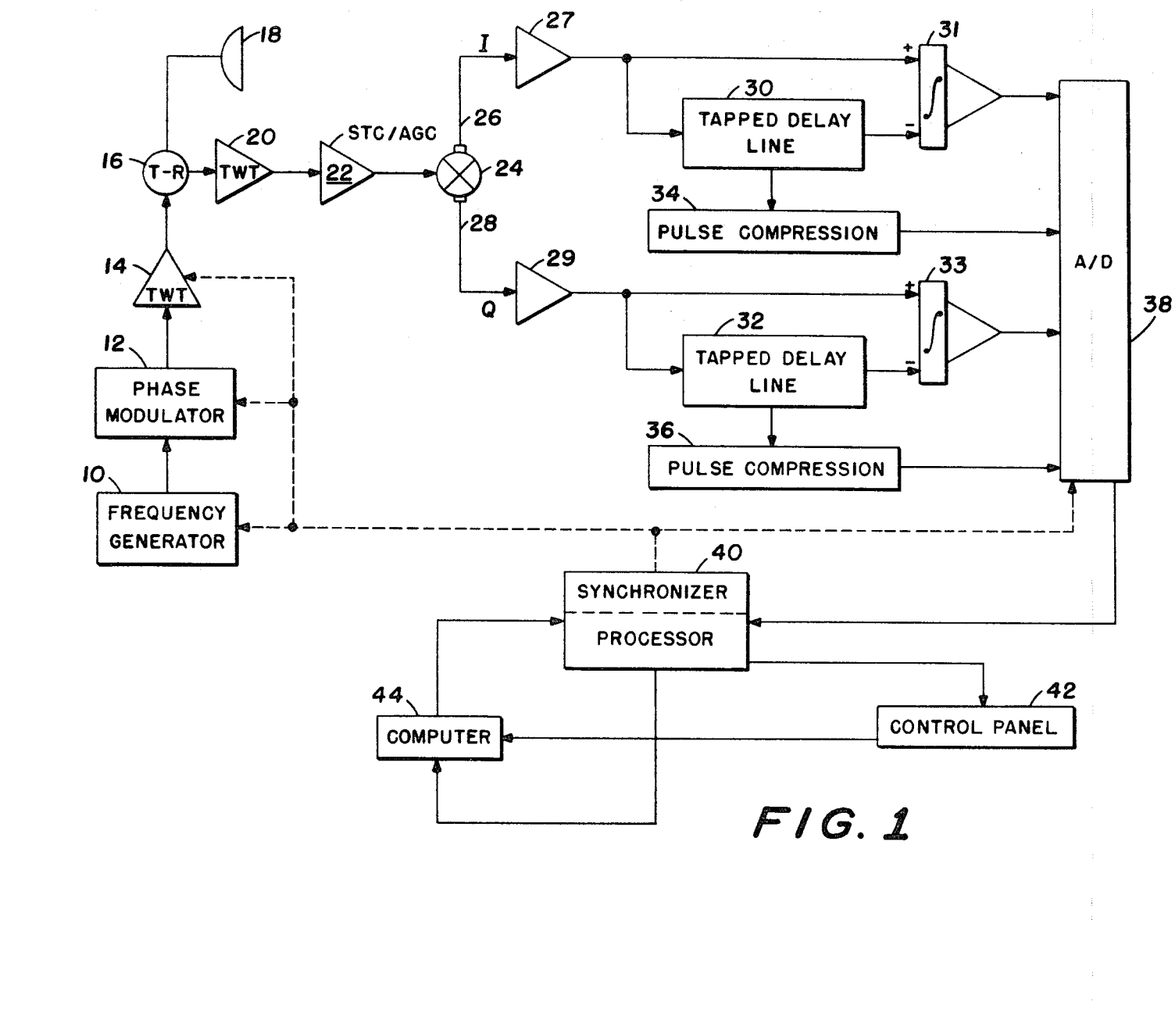
FIG. 1 is an overall block diagram of the present invention.

Referring now to FIG. 1, there is shown an overall block diagram of a radar system incorporating the "CODIMUP" processor of the present invention. The transmitter portion of FIG. 1 includes a programmable frequency generator 10, a fast switching binary phase modulator 12, a traveling wave tube (TWT) power amplifier 14, a transmit-receive selection circuit 16, and a parabolic dish antenna 18. The receiver system contains a low noise TWT 20, a digital sensitivity time control/automatic gain control (STC/AGC) circuit 22 and a quadrature homodyne mixer 24. The STC/AGC circuit 22 can be set manually or by a computer to attenuate strong returns from close in reflectors or to compensate for signals strength fall-off with range. The STC/AGC circuit 22 can be set to give one of five attenuation slopes; zero, linear, square, cube or fourth law. The STC/AGC circuit can be regulated by a computer to provide automatic gain control in the PD track mode. The STC/AGC circuit 22 will be described in greater detail hereinafter. The mixer circuit 24 has two outputs: a bipolar in-phase (I) video output 26 and a quadrature-phase (Q) video output 28. Uncoded bipolar video pulses are "match-filtered" by means of delay lines 30 and 32 and integrators 31 and 33. Coded pulses are compressed by feeding the output of the delay line circuits 30 and 32 into pulse compression circuits 34 and 36 respectively, which in one embodiment could each be a simple resistive decoding circuit. The uncoded outputs of integrators 31 and 33 as well as the coded outputs of pulse compression circuits 34 and 36 are fed into an A/D converter 38 whose output, in turn, is then fed into a synchronizer/processor (hereinafter referred to as the processor) 40. A control console 42 is used to manually designate mode and parameters. Adaptive control is also possible because all designations to the processor 40 are made through a computer control shown in block diagram at 44. Processed data can then be transferred from the computer for tracking computations, analysis, and printouts. The processor 40 is an expandable wired-program machine that performs coherent multiply-add cycles to cpmpute the discrete Fourier transform of the echo system signals in the PD mode and to null the return of a specific doppler in the MTI modes. The processor 40 also controls waveform generation and all timing.

Incorporated in the Coherent Multifunction Process (CODIMUP) is the above-mentioned digitally controlled RF attenuator STC/AGC unit 22 for performing sensitivity time control (STC), automatic gain control (AGC), and manual gain control. STC and manual gain control is in effect during the acquisition mode and AGC is in effect during the track mode. The STC/AGC unit 22 decreases the attenuation in the RF stage of CODIMUP from a maximum range to a minimum range. The initial attenuation and the slope thereof (either zero, linear, square, cube, or fourth law slopes are selectable. Maual gain control is a special case of the STC mode, namely zero slope, and introduces an attenuation in the front end of the processor. During the track mode, the AGC RF attenuation is controlled by the CODIMUP processor.

Figure 2:
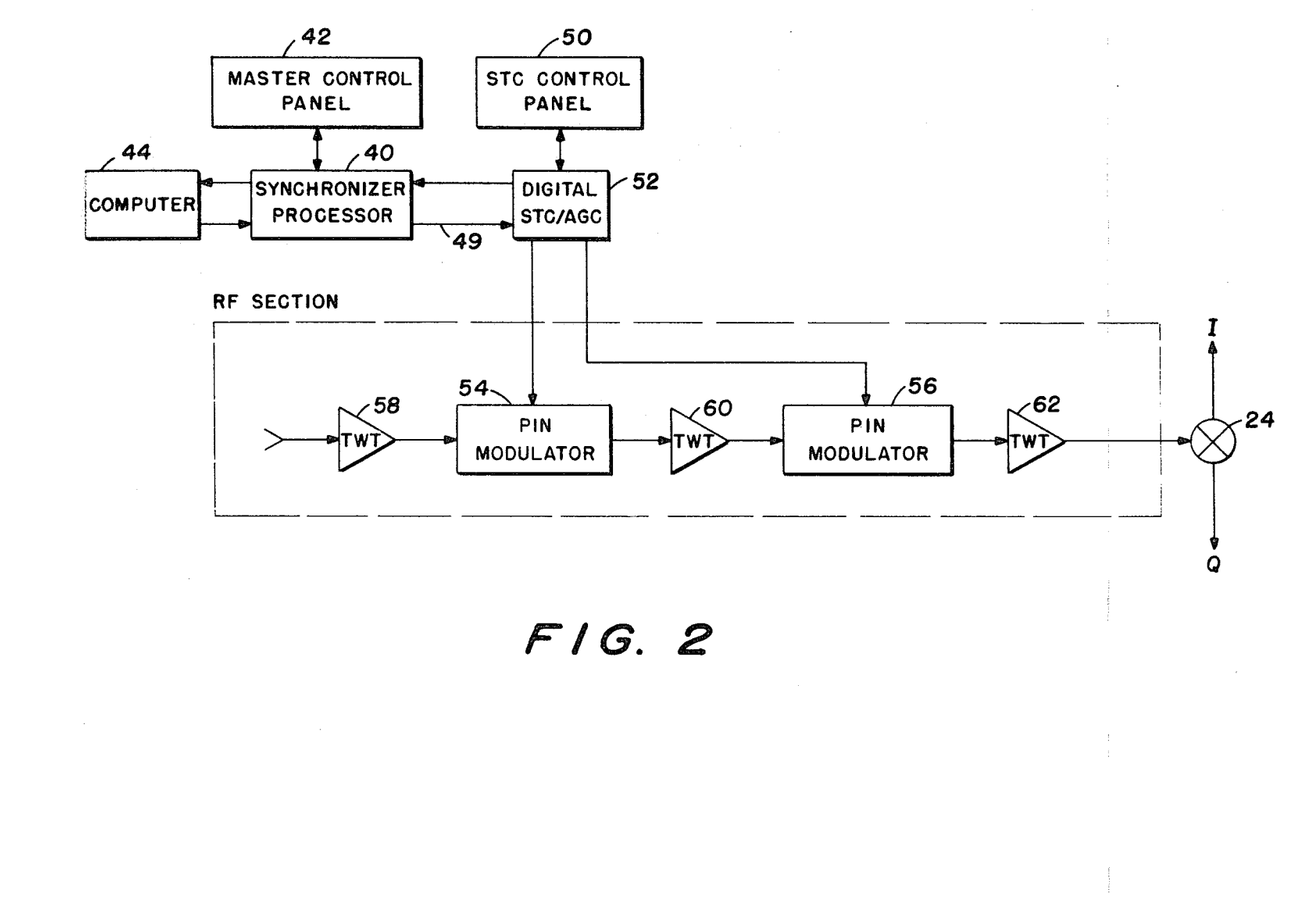
FIG. 2 is a block diagram of the sensitivity time control/automatic gain control (STC/AGC) unit.
Figure 3:
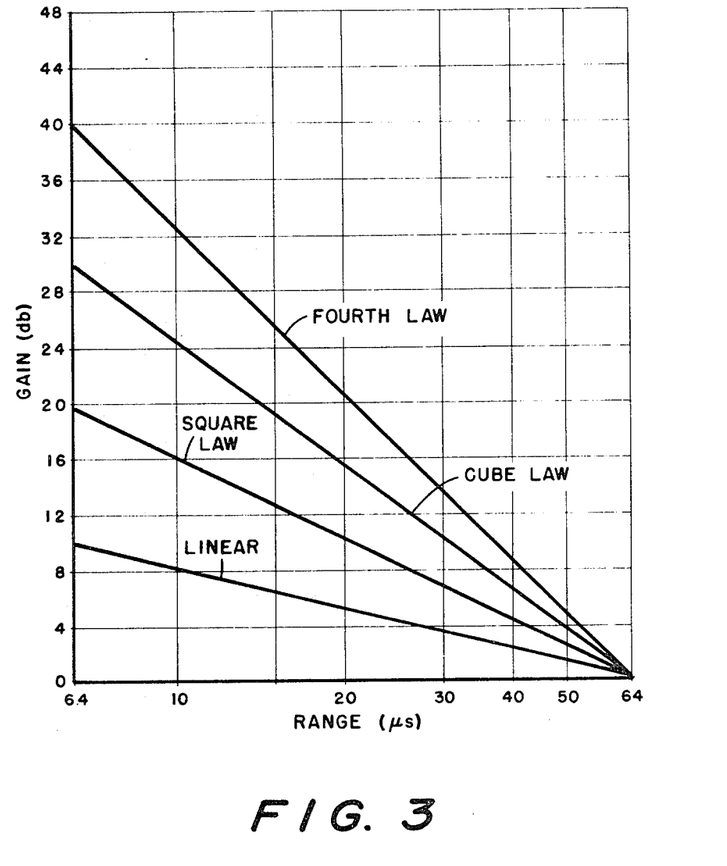
FIG. 3 is a graph of the possible STC/AGC function.

The digital STC/AGC unit 22 is interfaced with the present invention as is shown in FIG. 2. The STC unit consists of an STC control panel 50, a digital STC/AGC interface circuit 52, PIN modulators 54 and 56 which are each preceded by low noise TWT's 58 and 60 respectively. The output of PIN modulator 56 is fed to an output TWT 62 which in turn is fed into the mixer 24 as shown. The selection of either STC or AGC mode is done on a dwell-by-dwell basis via an acquisition/track control output 49 from the processor 40. In the sTC mode the PIN modulators 54 and 56 are driven with analog voltage derived from digitally generated sTC functions in the digital circuit 52. The STC functions (both slope and initial value) are selected by the STC control panel 50. A digital word describing the functions selected by the STC control panel 50 to the digital interface 52 is sent to the computer 44 via the processor 40. In the AGC mode, the STC control panel 50 is bypassed and a digital attenuation word is sent directly to the PIN modulators 54 and 56. Samples of the different STC functions are shown in the graph of FIG. 3.

Referring to the processor in more detail, CODIMUP has four major modes: MTI search, PD Acquisition, PD-Track, and Step-Frequency. Each mode has sub-options: MTI with two, three, or four-pulse coherent cancellation and incoherent integration of the uncancelled residues; choice of MTI pulse weighting constants, incoherent integration with no cancellation for a reference or burnthrough mode; PD with or without pulse amplitude weighting for sidelobe regulation; PD Track with several degrees of pulse compression for range resolution control; choice among several pulse repetition frequencies (PRF) and non-uniform or "staggered" PRF option to cope with range ambiguities, blind speed, and countermeasures; choices of number of pulses in each transmission; and choice of dwell rate. Mode and parameter selections are made manually or automatically thru the computer. Manual control independent of the computer is also possible.

In MTI mode, the processor is an $n$-pulse weighted summer with which binomial weighting is equivalent to an $(n-1)$-stage cascaded series of single delay-line cancellers. The MTI output is an $(N_r \times 1)$ amplitude matrix of moving target residue signals, where $N_r$ is the number of contiguous range gates (bins) in the dwell.

In PD mode, the processor computes the complex discrete Fourier transform of the echo doppler signal. The PD output is an $N_r \times N_d$ amplitude matrix of range vs doppler frequency, where $N_d$ is the number of doppler filters (bins), equal to the number of pulses in a transmission (dwell).

Figure 4:
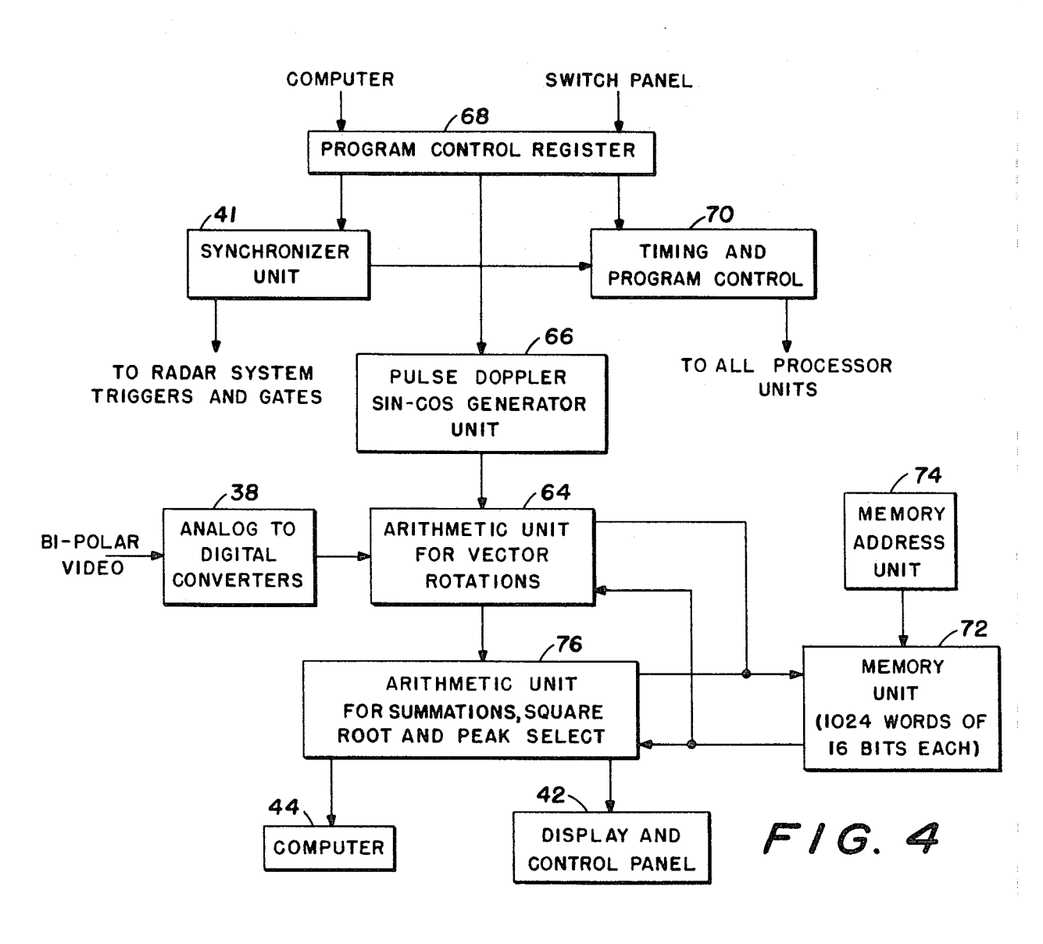
FIG. 4 is a block diagram of the processor unit of FIG. 1.

Referring now to FIG. 4 there is shown a block diagram of the processor unit. As previously mentioned, the I and Q bipolar video signals emergent from the integrators 31 and 33 and the pulse compression circuits 34 and 36 of FIG. 1 are digitized by four A/D converters 38. Two of the digital converters are in use for PD acquisition and MTI modes, and all four are used as PD track early and late gates. The output of the A/D converters are all applied to an arithmetic unit 64 wherein the incoming video data is sampled at predetermined intervals, converted into the proper format and weighted by vector rotation. The arithmetic unit receives direction input from a pulse doppler sine/cosine generator unit 66 which, in turn, receives direction from the program control register 68. The program control register 68 additionally supplied command information to a synchronizer unit 41 which inputs to the radar system triggers and gating signals. Additionally, the program control register 68 provides timing and program control in unit 70 for associated processor units. After the video is sampled, converted and weighed, it is either stored for processing at the end of the dwell (if it is one of the PD modes), or immediately added to a coherent running sum (if it is one of the MTI modes). If the video is to be stored it will be applied to a memory unit 72 which receives command information from a memory address unit 74. If the video is to be added to a coherent running sum the output of the arithmetic unit 64 is applied to an arithmetic unit 76 wherein summation, square root and peak select computations are performed. The output of arithmetic unit 76 is applied simultaneously to the computer 44 and to the display and control panel 42. The memory unit 72 is an integrated circuit random access memory having read or write cycle times. Within the arithmetic unit 64 are multiply units for complex vector rotations and accumulations. In arithmetic unit 76 square roots of the sum of the squares by approximation and real accumulations are performed. The pulse doppler sine/cosine generator unit 66 contains circuits for calculating rotating unit vectors, stepped either uniformly or by a prestored pattern. The program control register unit 68 directs all transistor-transistor and diode-transistor integrated circuits that are used in the generator unit 66.

Logically implemented as an expandable, fixed wired program machine, the processor is specifically oriented to solving the multiply-add cycles required for computing the discrete Fourier transform of either uniformly or non-uniformly sampled time series. Programming is done with the aid of shift registers and logical decision gates for conditional and loop controls. This design allows any number of non-conflicting micro-orders to be executed during a single compute cycle.

For coherent processing, the input signals to CODIMUP are quadrature components, labeled I for in-phase and Q for quadrature-phase. The processor performs complex arithmetic by simple multiplications and accumulations of the quadrature components, each of which is digitally represented by six bits plus sign. The final outputs are 15 bit amplitudes, obtained by taking the square root of the sum of the squares of the processed components. The I and Q video signals are sampled very 1.6 $\mu$secs within a range interval or "window" whose variable position and width are defined by the starting range $R_o$ and the number of range bins $N_r$. Since there are N pulses in a dwell, a total of $NN_r$ samples are taken for processing.

In the MTI modes (i.e. the $MTI_1$ and $MTI_2$), the processor is a $k$-pulse weighted summer, which binomial weighting is equivalent to a $(k-1)$-state cascaded delay-line vector canceller. The $MTI^k$ output is a set of $N_r$ amplitudes, resulting from accumulation of K inputs per range bin. With no clutter locking (having the MTI notch automatically track the clutter means velocity), the first MTI null centers at zero doppler.

The $MTI_1$ mode takes the square root of the sum of the squares of the I and Q components of each sample and accumulates the resulting amplitudes of N samples in each range bin. This is simply incoherent integration of detected video and serves as a "burnthrough" mode for maximum detectability in heavy jamming. It also serves as a reference mode by which performance in the MTI modes can be evaluated.

In the $MTI_2$, every sample is coherently subtracted from the sample that is received during the next pulse repetition interval. The differences or residues are incoherently accumulated for a total of N pulses per range bin processed The first I-channel sample can be represented by $$E(t) = E_i \sin (2\pi f_d t + \phi)$$

where $f_d$ is the doppler frequency and $\phi_o = 4\pi R_o/\lambda$ is the phase shift due to two-way range. If successive returns are highly correlated, the second I-sample is $E(t + T) = E_i \sin [2\pi F_d(t + T) + \phi o]$
where $T = 1/f_r$ is the pulse period, and $f_r$ is the pulse frequency. The I-residue is $$E_r = E(t + T) - E(t) = 2E_i \sin (\pi f_d/f_r) \cos (2\pi f_d t + \pi f_d/f_r + \phi_o ).$$

Note that unity weight is given to each sample. Similarly, the Q-residue is $$2E_i \sin (\pi f_d/f_r) \cos (2\pi f_d t + \pi f_d/f_r + \phi_o + \pi/2).$$

The square root of the sum of the squares of I and Q is the amplitude $$E_o = 2E_i \sin (\pi f_d/f_r)$$

This is identical to the response of a single-stage delay line vector canceller.

The pulse weights of $E(t)$ and $E(T + t)$ for the two-pulse canceller were $+1, -1$. For a $k$-pulse canceller having response identical to a cascaded $(k-1)$-stage delay line canceller, the pulse weights are the binomial coefficients of $(1 - x)^{k-1}$. By combining the weighted pulses, as shown above for the two-pulse case, the general power response for a $k$-pulse canceller is seen to be $S_o/S_i = 2^{2(k-1)} \sin^{2(k-1)} (\pi f_d/f_r)$. This equation gives the MTI power gain with respect to doppler frequency. It shows that stationary clutter is completely rejected, but so are targets at the "blind speeds" occurring at $f_d/f_r = 1, 2$, etc. Since perfect sample-to-sample amplitude stability was assumed, the equation gives the maximum realizable MTI rejection and gain. The average value of this function can be expressed as the series
$1/[(S_o/S_i)_m] = 1 + m^2 + [m(m-1)/2!] + [m(m-1)(m-2)/3!]^2 + ...,$
where $m = k-1$.
(Note that this series terminates after $m + 1$ terms, and the final term is 1.). Thus the MTI power gain, averaged over all doppler frequencies, for the $k=2, 3,$ and 4 modes are $$1/(S_o/S_{in})_2 = 2 = 3 \text{ db}$$

$$1/(S_o/S_i)_3 = 6 = 7/8 \text{ db}$$

$$1/(S_o/S_i)_4 = 20 = 13 \text{ db}$$

Figure 5:
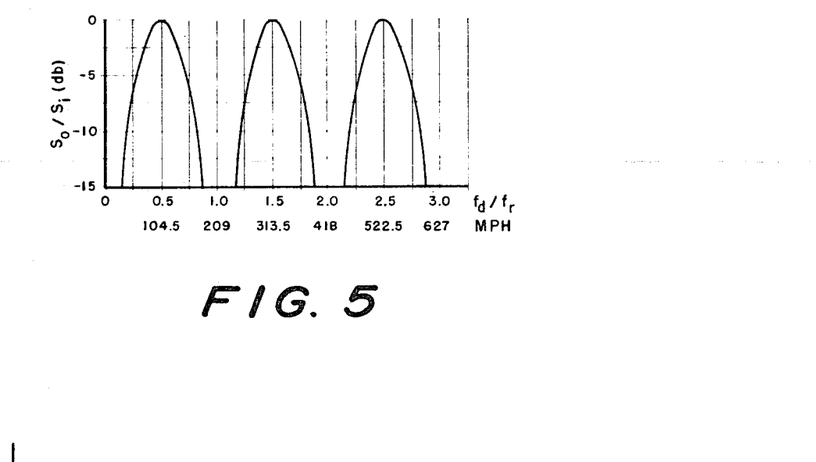
FIG. 5 is a chart showing a response curve for the MTI mode with three-pulse cancellation.

Increasing the value of k improves clutter rejection, but also increases the width of the blind speed regions. FIG. 5 is the response curve for a three-pulse canceller connected to an s-band search radar operating at 3000 MHz with an $f_r$ of 1870 Hz (maximum unambiguous range = 50 miles). The abscissa is calibrated in miles per hour. Assuming equally probable radial velocities from 0 to 627 mph, there is a 32 percent chance for a target response to be more than 13 db below peak.

Figure 6:
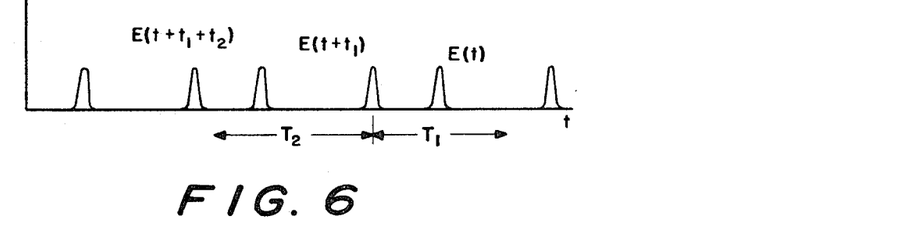
FIG. 6 is a chart showing another response curve for the MTI mode having staggered pulse trains.
Figure 7:
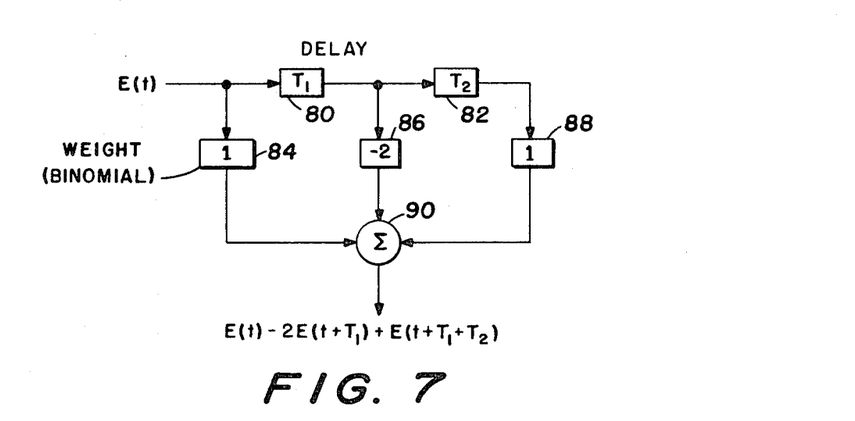
FIG. 7 is a block diagram of a circuit for processing the response curve of FIG. 6.
Figure 8:
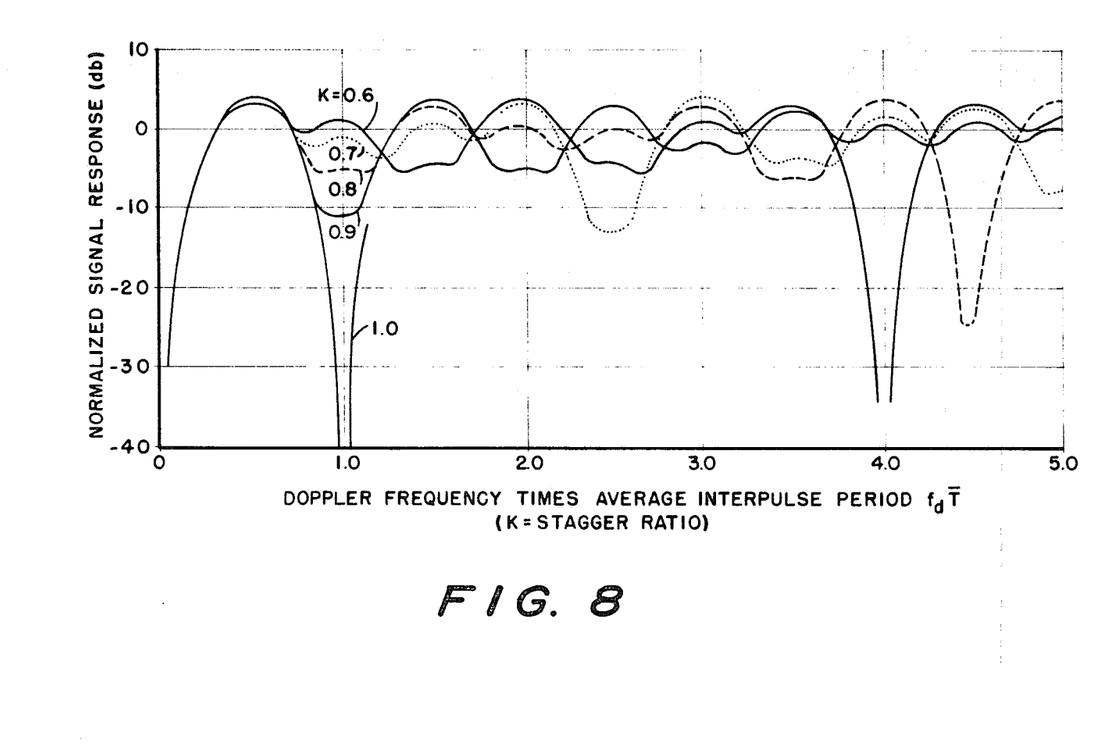
FIG. 8 is a chart showing a response curve having various stagger ratios.

Since the locations of the nulls are a function of $f_r$, reposition of the response curves for two or more pulse trains with different $f_r$'s would give a curve with "filled in" nulls. Just such a composite response can be obtained by alternating or "staggering" the length of the period T between pulses. FIG. 6 is an example of a staggered pulse train having two periods, T1 and T2. If the "stagger ratio" T1/T2 is the ratio of two integers a/b, then the first fully blind doppler frequency is $f_d$ blind = $a/T_1 = b/T_2$. Stagger ratios must be chosen with care, since intolerably deep nulls in the response can occur before the first complete null. FIG. 7 shows how a two-period staggered train may be processed by utilizing a pair of delay lines 80 and 82, binomial weighting circuits 84, 86 and 88, and an adder circuit 90. FIG. 8 gives the response curves for K ratios from 0.6 to 0.9. The first blind frequency in the range of the graph is at $f_d = 4/\overline{T}$, for a/b = 0.6. In the s-band radar example given above, this corresponds to a radial velocity of 836 mph, as compared to 209 mph for the uniform $f_r$ case.

Figure 9:
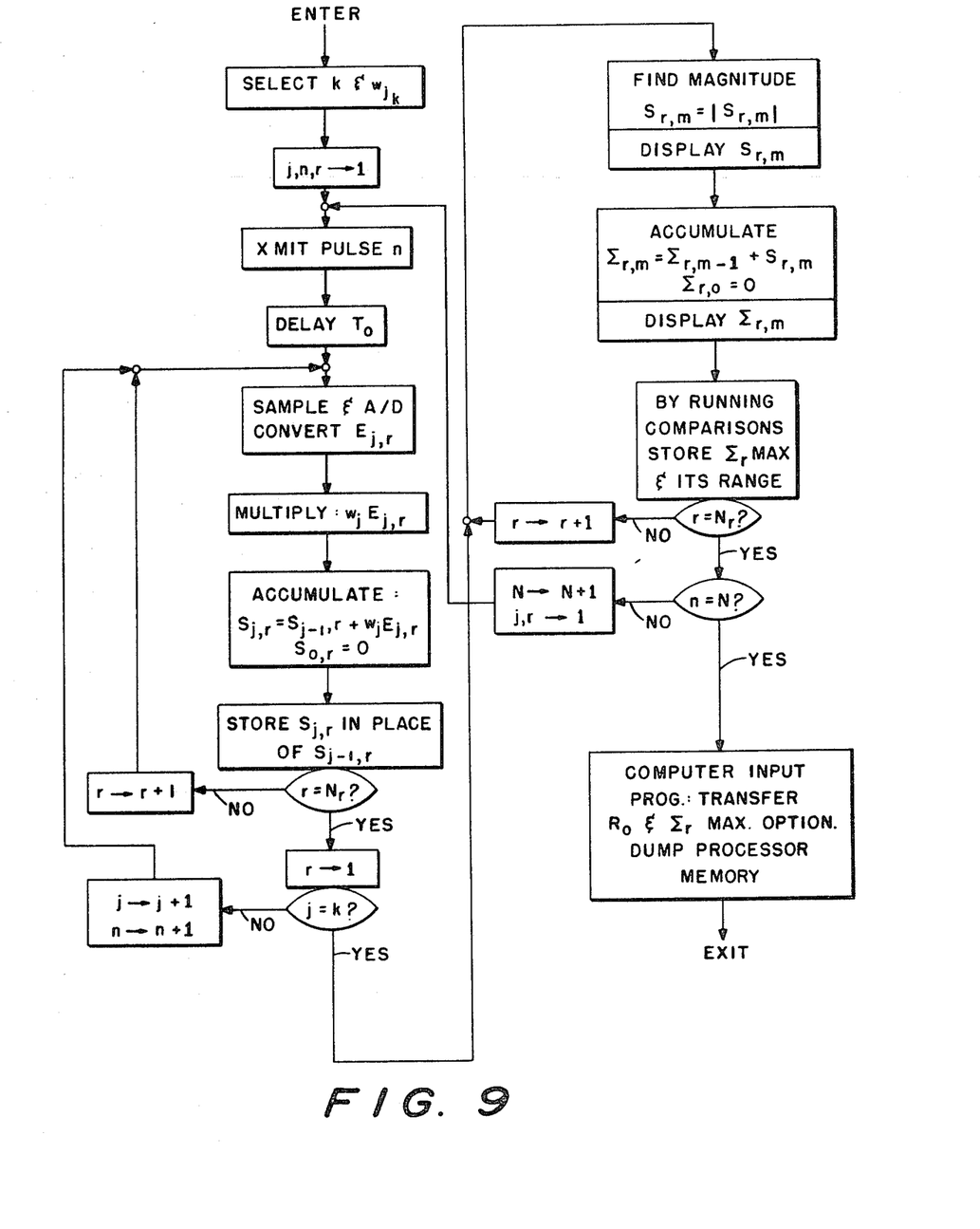
FIG. 9 is a flow diagram for MTI mode processing in the processor unit.

Refer to FIG. 9 for the basic MTI flow diagram. The $MTI_k$ mode is chosen either manually or by computer program control. The MTI "power" k is the number of pulses cancelled. The choices of k are 1, 2, 3, and 4. (The k=1 mode is actually simple integration of pulse amplitudes). Associated with each choice of k is a set of weighting constants $w_{j\,k}$, where j is the pulse number within the set of k pulses. The set $w_{j\,k}$ is adjustable by control panel toggle switches, and can be set to be binomial coefficients. As an example, assume $MTI_3$ is the chosen mode, with binomial weights (1, −2, 1), number of pulses N=33, and number of range bins $N_r$ =63. Starting at $T_o$, the echo from each pulse is sampled every 1.6μ sec, for a range resolution of 240 meters. At each range bin r, the I and Q returns from the first three pulses are multiplied by 1, −2, and 1. The weighted components are added algebraically, complete cancellation occurring only if there are no amplitude or phase differences among the three vectors. Following the coherent cancellation, the amplitude of the cancellation residue is found by calculating the square root of the sum of the squares of the I and Q residues. This amplitude is stored. Then the next three pulses are processed in the same way, and the second residue amplitude is added to the first one. This continues for 11 sets of 3 pulses each, or the total of 33 pulses in the dwell. The final memory content is the result of incoherent integration of 11 residue amplitudes of a three-pulse vector canceller for each of 63 range bins.

The coherent part of the processing can be expressed by $$I_r = \sum_{j=1}^{k} w_j I_{j,r} \text{ and } Q_r = \sum_{j=1}^{k} w_j Q_{j,r}$$

The incoherent part, or post-detection integration, can be expressed by $$S_r = \sum_{m=1}^{n/k} I^2_{r,m} + Q^2\, r, m)^{1/2}$$

where m is the cancellation pulse-set number.

The square root of the sum of the squares operation is implemented by the approximation $(a^2 + b^2)^{1/2} \approx$ (Larger of $|a| \alpha |b|$ ) + ½ (Smaller of $|a| \alpha |b|$ ).

(For ease in following, the flow diagram of FIG. 9 shows all operations occurring serially. However, parallel operations go on in CODIMUP wherever it is practical to implement them. For instance, the MTI incoherent loop actually is entered while the j=k coherent loop is being processed).

Computer transfers take place at the end of each dwell. The maximum integrated residue and its memory location are transferred along with the starting range $R_o$. The memory location and $R_o$ pinpoint the precise range bin of the maximum for target detection and tracking. At the beginning of the next dwell, updated $R_o$ is transferred from the computer to the processor. Presently, no tracking has been programmed, and the computer transfers manually-updated range information to CODIMUP.

If an "MTI dump" is called for, CODIMUP is stepped thru all four MTI modes, and the integrated residue amplitudes from the four dwells are transferred to the computer memory. The dwell outputs can then be stored on magnetic tape for future analysis, or for an immediate printout.

In the PD mode, the processor calculates the discrete Fourier transform of the returns from N pulses at each of $N_r$ range bins. The output is an $N \times N_r$ amplitude matrix of doppler-range cells. Doppler frequency is related to radial velocity by $$v_r = c/2\, f_d/f_o$$

where c is the speed of light in m/sec, $f_d$ is the doppler frequency in Hz, $f_o$ is the transmitter frequency in Hz, and $v_r$ is the target radial velocity in m/sec. Therefore, the PD output is a velocity analysis of the returns from the range window.

Within a range bin, the series of returns from N pulses are actually samples of the doppler signal from the interval. By taking the Fourier transform of those samples, the doppler spectrum is derived, but not without ambiguities caused by the discrete sampling. The ambiguity is more of a problem in PD than in MTI because of the conflicting demands of unambiguous doppler and range. The minimum sampling frequency necessary to measure $f_d$ with no ambiguity in an I-Q system is $f_s = f_r = 1/T > f_d$.

For unambiguous range response, $$R > c/2\, (T - \tau),$$

where $\tau$ is the pulse duration. Notice that reducing T to increase doppler coverage results in decreased maximum unambiguous range.

The content of a range-doppler resolution cell can be represented as $$A_{d,r} = |I_{d,r} + jQ_{d,r}| = \left| \sum_{n=0}^{N-1} x_{n,r} e^{-j\frac{2\pi}{N}nd} \right|$$

where $A_{d,r}$ is the amplitude in doppler bin $d$, range bin $r$; and $X_{n,r}$ is the vector return of pulse $n$ from range bin $r$.

CODIMUP solves the above equation by applying a sequence of phase rotation to the sets of raw I-Q returns from each range bin. The implementation equations are $$I_{n',d,r} = I_{n,r} \cos[(n\Delta\theta + \delta_n)d] + Q_{n,r} \sin[(n\Delta\theta + \delta_n)d]$$
$$Q_{n',d,r} = Q_{n,r} \cos[(n\Delta\theta + \delta_n d] - I_{n,r} \sin[(n\Delta\theta + \delta_n)d]$$

$$A_{d,r} = \left[ \left( \sum_{n=0}^{N-1} I_{n',d,r} \right)^2 + \left( \sum_{n=0}^{N-1} Q_{n',d,r} \right)^2 \right]^{1/2}$$

where I' and Q' are the rotated I and Q components.

Figure 10:
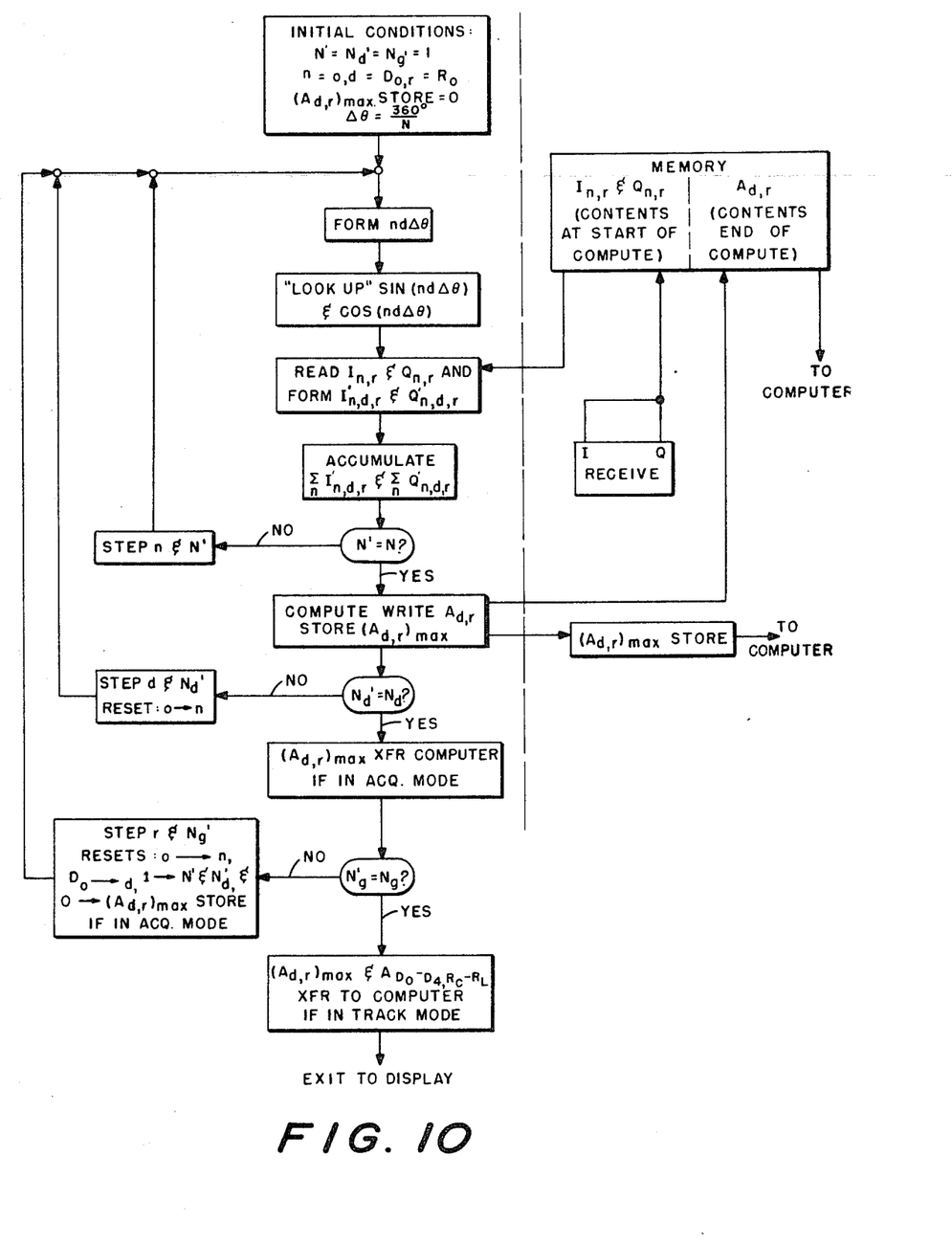
FIG. 10 is a flow diagram for PD mode processing in the processor unit.

FIG. 10 is the flow diagram for the PD processing.

SUMMARY OF THE INVENTION

In summary, therefore, what has been disclosed is a digital processor-synchronizer which accepts various encoded waveforms and performs coherent processing in any of a number of modes during any one dwell. The modes include MTI and PD processing. A post-detection integration capability allows for non-coherent processing. A small, general purpose computer controls the processor and allows rapid mode and radar parameter change. The combination of the above elements provides a system with automatic adaptive response to whatever clutter and noise environment is encountered.

We claim:

1. In a coherent, multifunction processor for accepting encoded waveforms and for performing coherent processing thereupon, the combination comprising;
   variable attenuation means receiving and attenuating said encoded waveforms whenever a predetermined signal strength is received therein;
   mixer means responsive to said attenuated encoded signal for dividing said attenuated encoded signal into coded and uncoded in-phase and quadrature-phase video components;
   means operably connected to said mixer means for match-filtering said uncoded video components;
   means operably connected to said mixer means for compressing said coded video components;
   converting means receiving said filtered uncoded video components and said compressed coded video components for converting all of said components into a predetermined data format;
   signal synchronizing means responsive to the output of said converting means for providing signal-type identification of said converted signal;
   signal processing means receiving the output of said signal synchronizing means for extracting the information content from said synchronized signal; and
   mode control means operably connected to said signal synchronizing means and to said signal processing means for controlling the operation of said signal synchronizing processing means, wherein the manner of said control is dependent upon the characteristics of said encoded waveforms.

2. The processor as claimed in claim 1 wherein signal-type identification is either in a moving target indicator mode or in a pulse doppler mode and further wherein said manner of control of said mode control means is also determined by said signal-type identification.

3. The processor as claimed in claim 2 wherein said variable attenuation means is a digital sensitivity time control/automatic gain control circuit having a plurality of attenuation slopes.

4. The processor as claimed in claim 3 wherein said converting means is an analog-to-digital converter.

5. The processor as claimed in claim 4 wherein said sensitivity time control/automatic gain control circuit is regulated by said mode control means.

6. The processor as claimed in claim 5 wherein said match-filter means comprises
   delay line circuit means receiving the output of said mixing means for delaying in time said mixed signal; and
   integrating circuit means responsive to the output of said delay line circuit means for integrating said delayed output signal.

7. The processor as claimed in claim 6 wherein said compressing means comprises
   video delay line means operably connected to said mixing means, for delaying in time said coded video components, said video delay line means producing therefrom a coded pulse output; and
   means receiving said coded pulse output of said video delay line means for compressing in time said coded pulse output.

8. The processor as claimed in claim 7 wherein said pulse compression means is a resistive decoding circuit.

9. The processor as claimed in claim 8 wherein said signal processing means is an expandable wired-program circuit means for performing coherent multiply-add cycles in the computation of discrete Fourier transforms of the echo signals in the pulse doppler mode and to null the return of a specific doppler response in the moving target indicator.

10. The processor as claimed in claim 9 wherein said signal processing means comprises:
    arithmetic means receiving the output of said analog-to-digital converting means for sampling said incoming video data at predetermined intervals, for converting said sampled data into the proper format and for weighing said converted data by vector rotation;
    sine/cosine generating means operably connected to said arithmetic means for providing direction input to said arithmetic means during said pulse doppler mode; and
    program control register means responsive to said sine/cosine generating means for directing said sine/cosine generating means and for supplying command information to the signal processing unit.

11. The processor as claimed in claim 10 wherein said signal processing means further comprises central computer control means for storing the processed video at the end of a dwell if said mode control means is in a pulse doppler mode or for adding the processed video to a coherent running sum if said mode control means is in said moving target indicator mode.

12. The processor as claimed in claim 11 wherein said arithmetic means performs summation, square root and peak select computations when said processed video is to be added to a coherent running sum.

* * * * *